(12) United States Patent
Iikubo et al.

(10) Patent No.: US 7,580,270 B2
(45) Date of Patent: Aug. 25, 2009

(54) ELECTRONIC APPARATUS

(75) Inventors: Takashi Iikubo, Ome (JP); Shigeki Nishiyama, Hino (JP); Masataka Tokoro, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 311 days.

(21) Appl. No.: 11/657,585

(22) Filed: Jan. 25, 2007

(65) Prior Publication Data
US 2007/0177345 A1 Aug. 2, 2007

(30) Foreign Application Priority Data
Jan. 31, 2006 (JP) ............................. 2006-022453

(51) Int. Cl.
*H05K 9/00* (2006.01)
(52) U.S. Cl. ...................................... 361/818; 361/816
(58) Field of Classification Search ................ 361/755, 361/816, 800, 818, 600, 679, 683, 715, 772, 361/775, 784–785, 803; 174/35 R, 51, 250, 174/262; 312/223
See application file for complete search history.

(56) References Cited
U.S. PATENT DOCUMENTS
4,829,432 A * 5/1989 Hershberger et al. ........ 361/818
5,574,625 A * 11/1996 Ohgami et al. .............. 361/684
6,115,243 A * 9/2000 Horii ........................... 361/684
6,362,974 B1 * 3/2002 Lettang ....................... 361/790
6,942,153 B1 * 9/2005 Yuan et al. .............. 235/472.01
7,170,742 B2 * 1/2007 Na et al. ...................... 361/684

FOREIGN PATENT DOCUMENTS

| JP | 11-184559 | 7/1999 |
| JP | 2002-182788 | 6/2002 |
| JP | 2004-165552 | 6/2004 |
| JP | 2005-190296 | 7/2005 |

\* cited by examiner

*Primary Examiner*—Dean A. Reichard
*Assistant Examiner*—Hung S Bui
(74) *Attorney, Agent, or Firm*—Pillsbury Winthrop Shaw Pittman, LLP

(57) ABSTRACT

An electronic apparatus is equipped with housing, a motherboard, a stud, and a lid. The housing constitutes an outer shell of the main body having a shielding property against electromagnetic radiation and an opening located on the bottom wall. The opening is smaller than the total mounting area of a plurality of extension modules which are layered each other. The motherboard is installed in the housing. The stud is attached on the bottom surface side of the motherboard and is fastened by a set of screws together with the plurality of extension modules. The lid has a shielding property against electromagnetic radiation and covers the opening.

11 Claims, 6 Drawing Sheets exemplary perspective view showing an electronic apparatus according to one embodiment of the present invention;

ELECTRONIC APPARATUS

CROSS-REFERENCE TO RELATED APPLICATIONS

This application is based upon and claims the benefit of priority from Japanese Patent Application No. 2006-022453, filed Jan. 31, 2006, the entire contents of which are incorporated herein by reference.

BACKGROUND

1. Field

One embodiment of the present invention relates to an electronic apparatus which has a plurality of extension modules mounted on a motherboard which is built into housing.

2. Description of the Related Art

A portable electronic apparatus represented by a portable computer is requested to be lightweight and not bulky. Consequently, the inside of housing which forms the outer shell of the main body is filled with main devices including the motherboard nearly with no space therebetween. Therefore, requests made by each user for different specifications must be met by re-assembling extension modules with varying functions. Because these extension modules are not frequently replaced once they are mounted, they are mounted on the motherboard through an opening at the bottom of the housing.

When an electronic apparatus is operated, electromagnetic interference (EMI) is generated. To prevent this EMI from leaking to the outside, the housing of the electronic apparatus is made from conductive members or conductive film is formed inside. Thus, the opening is covered with a lid made of a conductive member or a lid provided with conductive film as the housing of electronic apparatus.

The electronic apparatus described in Jpn. Pat. Appln. KOKAI Publication No. 2004-165552 has two memory modules mounted as extension modules to be mounted through the opening at the bottom of the main body. The memory modules are arranged along the motherboard surface.

However, in view of shielding against electromagnetic radiation, it is desired to make the opening in the housing for mounting extension modules as small as possible and to reduce the number of openings to a minimum.

BRIEF SUMMARY OF THE INVENTION

According to an embodiment of the invention, an electronic apparatus is equipped with housing, a motherboard, a stud, and a lid. The housing constitutes an external shell of the main body having a shielding property against electromagnetic radiation and an opening located on the bottom wall. The opening is smaller than the total mounting area of a plurality of extension modules which are layered each other. The motherboard is built into the housing. The stud is attached on the bottom side of the motherboard and is fastened by a set of screws together with the plurality of extension modules. The lid has a shielding property against electromagnetic radiation and covers the opening.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the drawings. An electronic apparatus according to one embodiment of the present invention provides an electronic device allowing mounting of a plurality of extension modules with an opening area smaller than the total mounting area of the plurality of extension modules.

Figure 1:
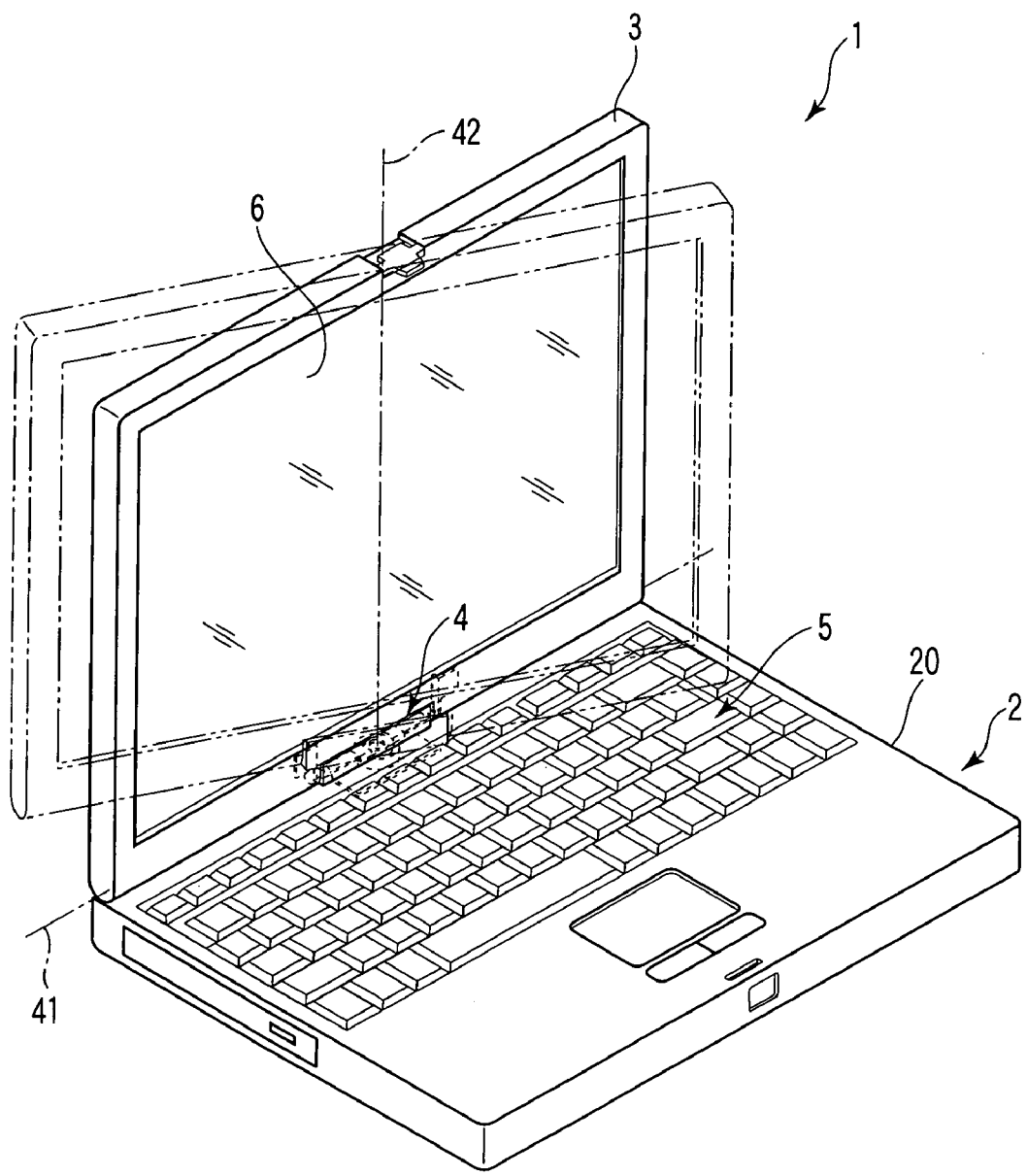
FIG. 1 is an exemplary perspective view showing an electronic apparatus according to one embodiment of the present invention.

An electronic apparatus 1 of one embodiment according to the present invention will be described referring to FIG. 1 through FIG. 8 with a portable computer taken as an example. The electronic apparatus 1 shown in FIG. 1 is equipped with a main body 2, a display unit 3, and a hinge mechanism 4. For convenience of description in the present embodiment, with the main body 2 installed on a desk, etc., and as viewed from the user side, directions are defined as the right side, left side, front side which is the near side, rear side which is the far back side, and upward and downward in the vertical direction.

The main body 2 has housing 20 which forms an outer shell as shown in FIG. 1. To the top of the housing 20, a keyboard 5 which is an entry means is equipped. The display unit 3 is equipped with an liquid crystal display (LCD) 6 and a digitizer. The LCD 6 is one example of the display unit and may be a plasma display, organic electroluminescence, surface conduction electron-emitter display, etc. The digitizer is one of the input means which enables input operation from the surface and in place of the digitizer, a touch panel may be layered on the surface of the LCD 6.

The hinge mechanism 4 has a rotation shaft 41 and a swivel shaft 42, and links the main body 2 to the display unit 3 as shown in FIG. 1. The rotation shaft 41 is disposed along one side of the display unit 3 on the rear side of the main body 2 while the display unit 3 is superposed on the main body 2. The rotation shaft 41 rotates the display unit 3 with respect to the main body 2 from a lying-down state to a raised state.

The swivel shaft 42 is disposed in the direction orthogonal to the rotation shaft 41 with the display 3 raised with respect to the main body 2 and swings the display unit 3 together with the rotation shaft 41. Due to the rotation shaft 41 and the swivel shaft 42, the hinge mechanism 4 changes the posture of the display unit 3 to a state with the display surface 3a of the display unit 3 turned down with respect to the main body 2, a state with the display unit 3 raised and the display surface 3a directed to the keyboard 5 side, and a state with the display surface 3a turned upward and the display unit 3 laid one top of the main body 2.

Figure 2:
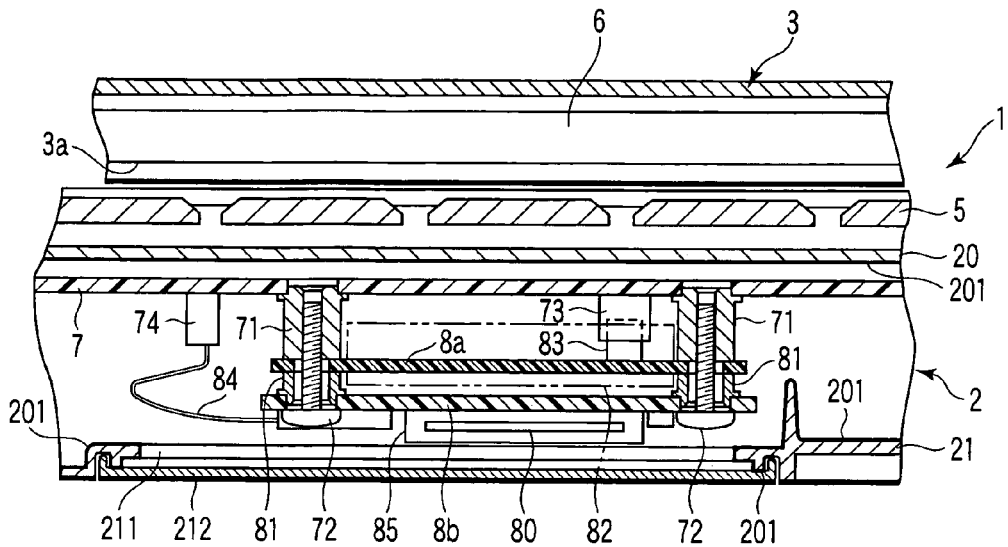
FIG. 2 is an exemplary cross-sectional view cut across extension modules to be built into a main body of the electronic apparatus shown in FIG. 1.

The housing 20 has an electrically conductive layer 201 with a shielding property against electromagnetic radiation on the inner surface and is equipped with a motherboard 7 as shown in FIG. 2. The electrically conductive layer 201 is formed by plating, spray coating, etc. The housing 20 has an opening 211 on a bottom wall 21. A lid 212 is attached to the opening 211. The lid 212 is formed by an electrically conductive member with a shielding property against electromagnetic radiation, for example, aluminum alloy, magnesium alloy, etc. The electrically conductive layer 201 is formed to the edge of the opening 211 which comes into contact with the lid 212 and is electrically connected to the lid 212 mounted on the opening 211.

Figure 6:
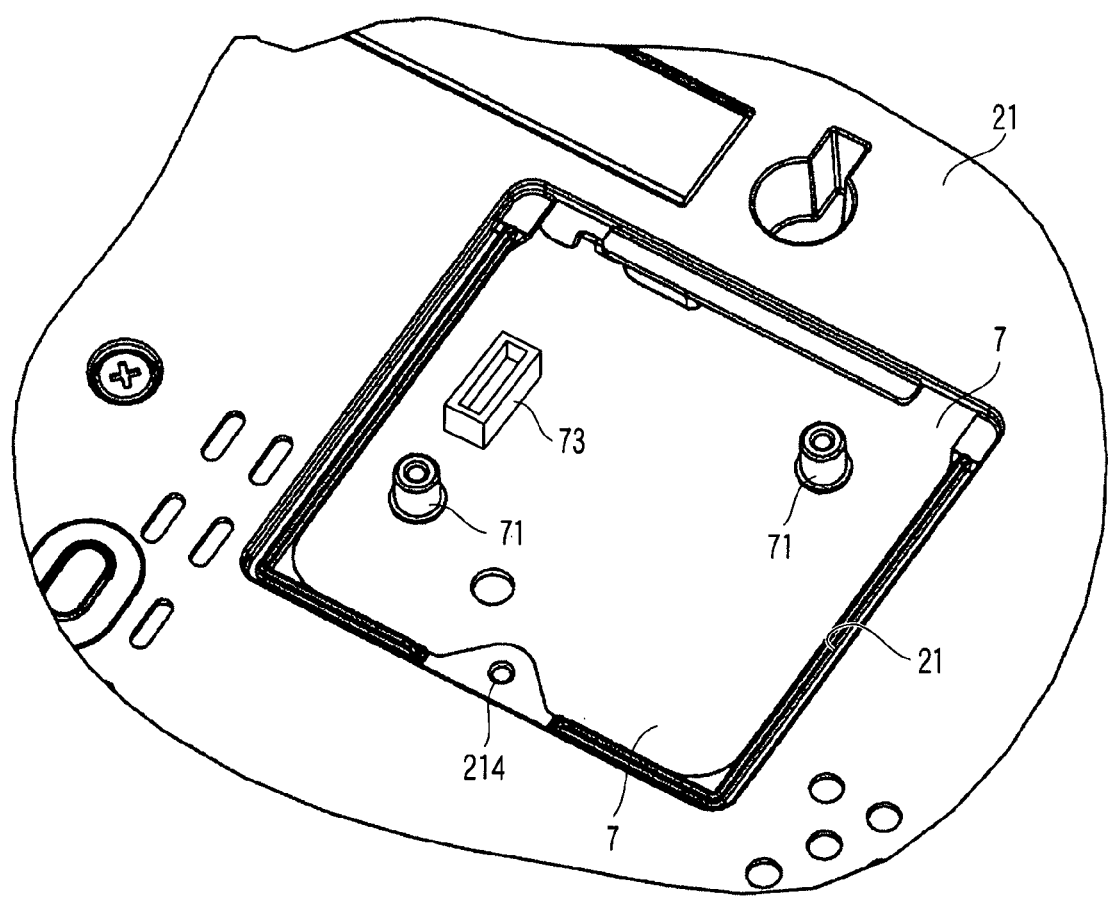
FIG. 6 is an exemplary perspective view showing a state in which a modem daughter card (MDC) module is removed from the electronic apparatus shown in FIG. 5.

On the undersurface side of the motherboard 7, a stud 71 is brazed as shown in FIG. 2 and FIG. 6. Two extension modules, which are layered each other, are fixed to the stud 71, by tightening together with a set of screws 72 as shown in FIG. 2. One of the extension modules shown in FIG. 2 is modem daughter card (MDC) module 8a as an example of communication module, and the other one is a SIM-mounted module 8b for mounting a subscriber identity module (SIM) card 80. The SIM card 80 is an IC card which can store subscriber authentication information, etc.

The MDC module 8a and SIM-mounted module 8b are layered with a spacer 81 therebetween, and is fixed to the stud 71 with the MDC module 8a disposed close to the motherboard 7. The spacer 81 is brazed to the SIM-mounted module 8b side with ease of assembly taken into account.

Figure 5:
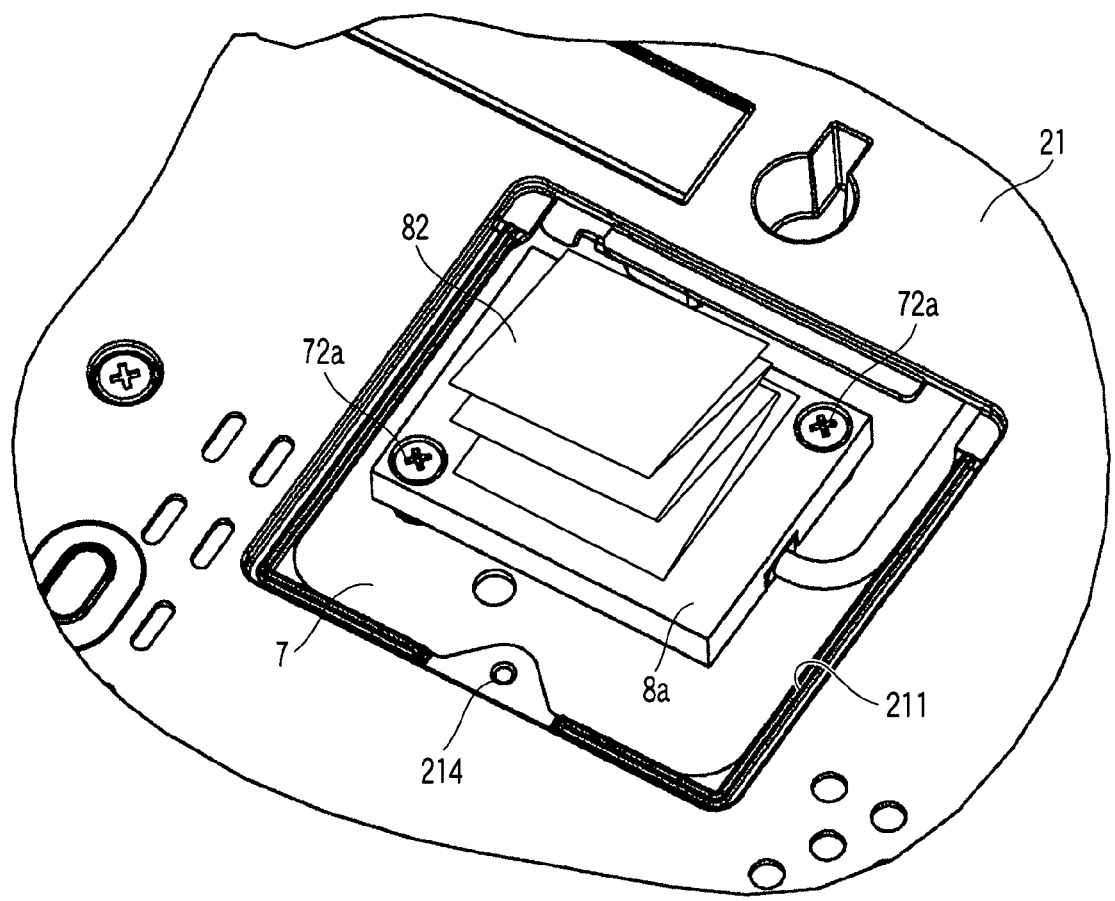
FIG. 5 is an exemplary perspective view showing a state in which a subscriber identity module (SIM) card mounting module is detached from the electronic apparatus shown in FIG. 4.

The MDC module 8a is connected to the motherboard 7 by connectors 73, 83 which are inserted in the piled direction with respect to the motherboard 7. The SIM-mounted module 8b is connected to a connector 74 mounted on the motherboard 7 outside the range covered by the MDC module 8a by a cable 84. In place of the cable 84, flexible wiring may be used. The MDC module 8a has a label 82 folded zigzag affixed as shown in FIG. 5. This label 82 is pressed down by the SIM-mounted module 8b.

The MDC module 8a and SIM-mounted module 8b are layered and mounted on the motherboard 7. Therefore, the opening 211 is formed to be smaller than the total mounting area of these two extension modules and slightly larger than the larger one of the MDC module 8a and the SIM-mounted module 8b.

Figure 3:
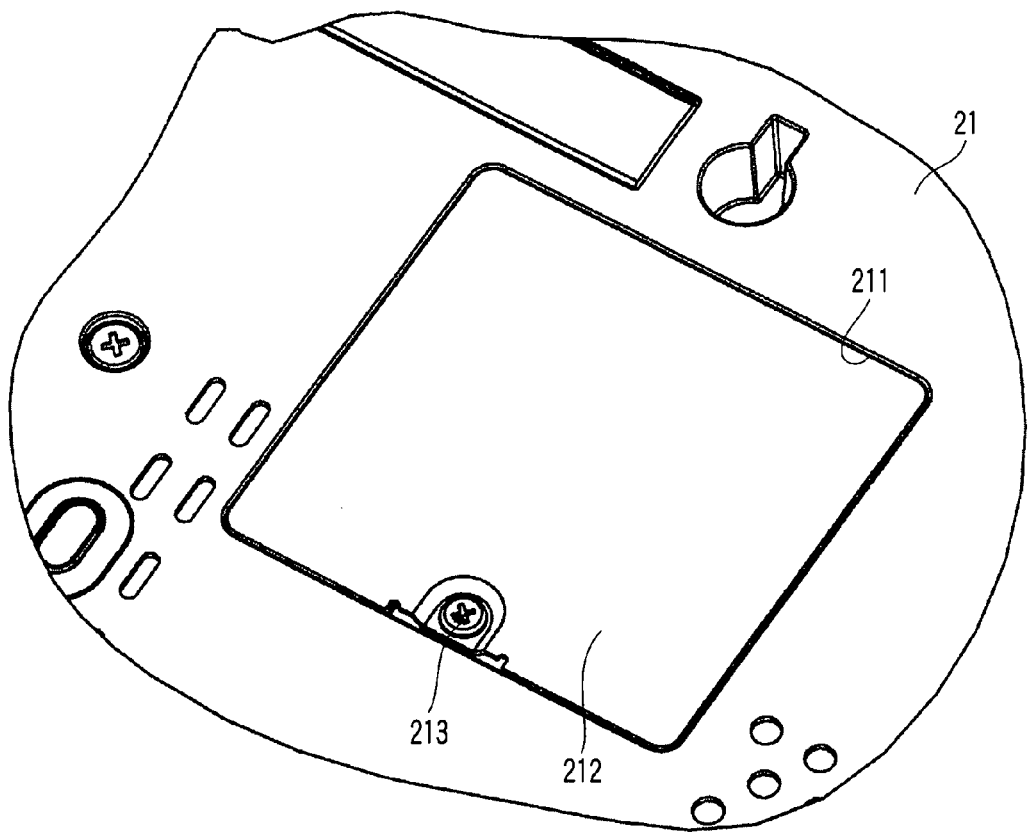
FIG. 3 is an exemplary perspective view showing a state in which a lid is installed to an opening located at the bottom wall of the main body of the electronic apparatus shown in FIG. 1.

When access is made to the MDC module 8a and SIM-mounted module 8b, the electronic apparatus 1 is turned over in such a manner that the lid 212 can be seen as shown in FIG. 3. In FIG. 3 through FIG. 6, the front side of the main body 2 is the side to which a locking screw 213 provided on one side of the lid 212 and a screw hole 214 in which the screw 213 is engaged are provided.

Figure 4:
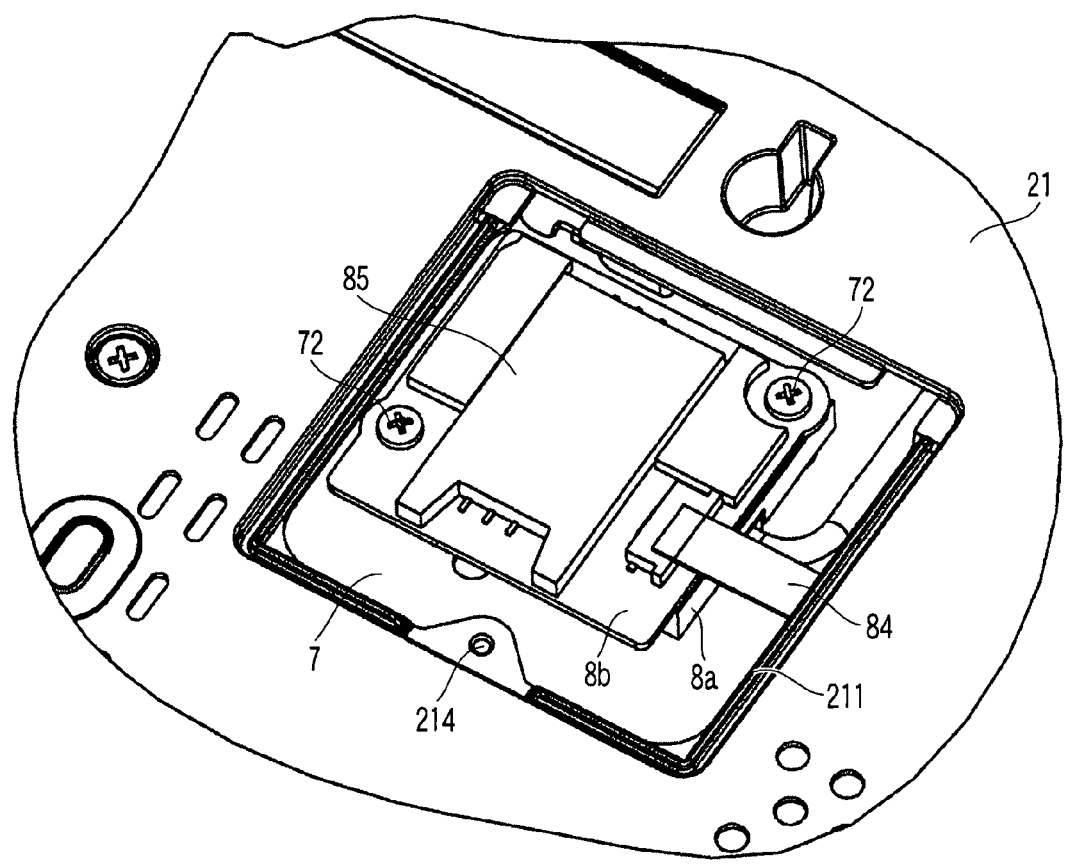
FIG. 4 is an exemplary perspective view showing a state in which the lid of the electronic apparatus shown in FIG. 3 is removed.

As shown in FIG. 4, when the lid 212 is removed, the SIM-mounted module 8b is seen. A socket 85 for mounting the SIM card 80 is mounted on the SIM-mounted module 8b. Depending on working practice, the electronic apparatus 1 may be turned over with either of four sides on the outer circumference set as a center. Consequently, with the ease of mounting and removing the SIM card 80 taken into account, the socket 85 is desirably mounted in such a manner that the SIM card 80 can be mounted in a direction along the forward or rearward direction of the main body 2.

The electronic apparatus 1 will be handled in the same manner as a cellular phone in which the SIM card 80 is mounted, when the electronic apparatus 1 carries the SIM card 80. Therefore, the information stored in the SIM card 80 such as subscriber ID, etc., is easily transferred to a new device by shifting the SIM card 80 from ex-device to a new device.

Furthermore, it is able to access to the MDC module 8a as shown in FIG. 5, when the screws 72, which are diagonally disposed on the SIM-mounted module 8b, is removed. If the SIM-mounted module 8b is not required, it is only necessary to fix the MDC module with a shorter screw 72a.

Figure 8:
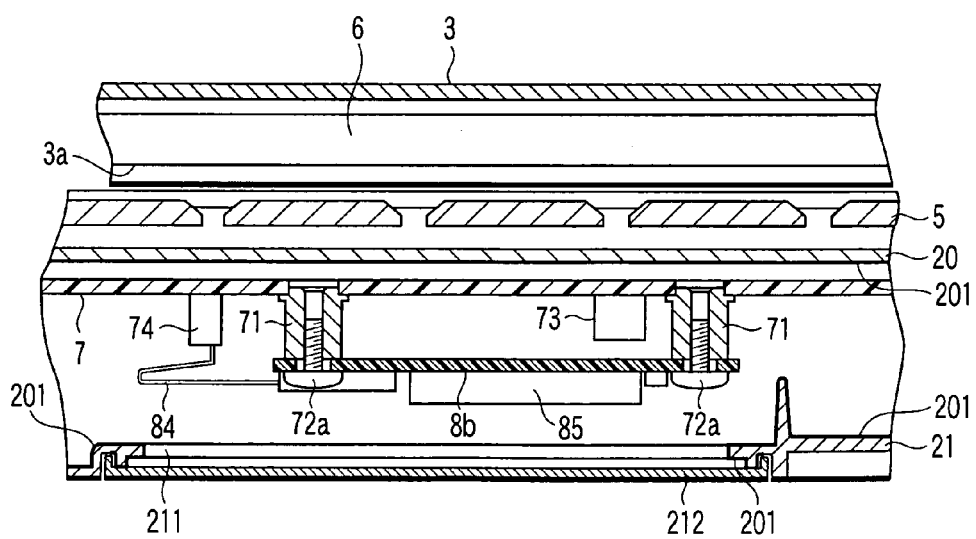
FIG. 8 is an exemplary cross-sectional view of a state in which the SIM mounted module is mounted on the stud shown in FIG. 6.

When a communication module such as modem cards, etc., is installed by using a slot for PC-card, the MDC module 8a is removed because it is not required and the SIM-mounted module 8b only has to be fixed to the stud 71 with the shorter screw 72a as shown in FIG. 8. In FIG. 8, the SIM-mounted module 8b which has no spacer is mounted. The SIM-mounted module 8b with the spacer 81 which is brazed may be installed on the stud 71 as shown in FIG. 2.

Figure 7:
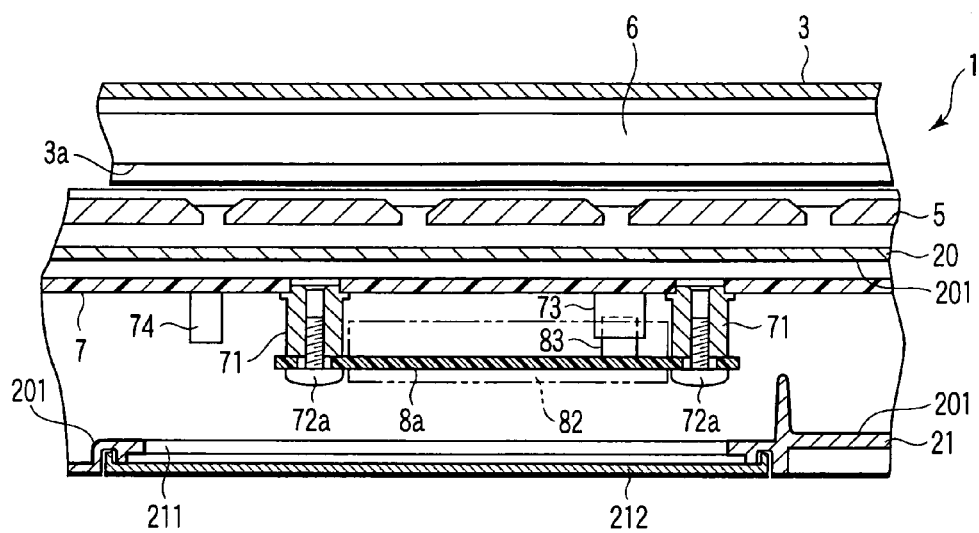
FIG. 7 is an exemplary cross-sectional view of a state in which the MDC module is mounted on a stud shown in FIG. 6.

In this way, since the stud 71 is provided in such a manner to correspond to both MCD module 8a and SIM-mounted module 8b, the MDC module 8a and SIM-mounted module 8b will be mounted in any one of the forms of, installing the MDC module 8a in a single layer as shown in FIG. 5 and FIG. 7, installing the SIM-mounted module 8b in a single layer as shown in FIG. 8, and installing the MDC module 8a and the SIM-mounted module 8b in double layer.

Because this electronic apparatus 1 has a plurality of extension modules mounted on the motherboard 7 by piling up them each other as described above, the opening 211 to access to these extension modules is made smaller in the opening area than the total mounting area of a plurality of extension modules mounted. It is easy to shield electromagnetic radiation noise emitting from the housing 20 by reducing the area of the opening 211 provided in the housing 20 of the electronic apparatus 1.

According to the electronic apparatus of one embodiment, a plurality of extension modules can be mounted in a smaller opening area than the total mounting area of a plurality of extension modules.

In addition, because in the case of the present embodiment, a plurality of extension modules related to communication can be accessed from the same one opening, only one operation is required and the operability can be improved.

The invention is not limited to the foregoing embodiments but various changes and modification of its components may be made without departing from the scope of the present invention. Also, the components disclosed in the embodiments may be assembled in any combination for embodying the present invention. For example, some of the components may be omitted from all the components disclosed in the embodiments. Further, components in different embodiments may be appropriately combined.

What is claimed is:

1. An electronic apparatus, comprising:
    a housing which constitutes an outer shell of a main body having a shielding property against electronic radiation and an opening provided on a bottom wall, said opening is smaller than the total mounting area of a plurality of extension modules that are layered each other;

a motherboard installed in the housing;

a stud attached on the bottom surface of the motherboard and co-fastening the plurality of extension modules with one set of screws; and a lid which has a shielding property against electromagnetic radiation and which covers the opening, wherein the plurality of extension modules includes a modem daughter card module with modem functions and a subscriber identity module mounted module on which a subscriber identity module card is mounted, and the extension module are mounted on the motherboard by any one of at least three forms of:

fixing the modem daughter card module in a single layer to the stud;

fixing the subscriber identity module-mounted module in a single layer to the stud; and fixing the modem daughter card module and the subscriber identity module-mounted module to the stud by piling each other with spacer therebetween disposing the modem daughter card module close to the motherboard.

2. The electronic apparatus according to claim 1, wherein the modem daughter card module is connected to the motherboard by a connector inserted in the piling direction with respect to the motherboard.

3. The electronic apparatus according to claim 1, wherein the subscriber identity module mounted module is connected to the motherboard by a cable.

4. The electronic apparatus according to claim 1, wherein the modem daughter card module has a label which is folded zigzag, said label is pressed by the subscriber identity module mounted module.

5. The electronic apparatus according to claim 1, wherein the subscriber identity module mounted module is extractably inserted a subscriber identity module along the longitudinal direction of the housing as viewed from the user.

6. An electronic apparatus, comprising:

a housing which constitutes an outer shell of a main body having a shielding property against electronic radiation and an opening provided on a bottom wall, said opening being smaller than the total mounting area of a plurality of extension modules that are layered with each other;

a motherboard installed in the housing;

a stud attached on the bottom Surface of the motherboard and co-fastening the plurality of extension modules with one set of screws; and a lid which has a shielding property against electromagnetic radiation and which covers the opening, wherein, the plurality of extension modules includes a first module and a second module, and are mounted to the motherboard by any one of at least three forms of:

fixing the first module in a single layer to the stud, fixing the second module in a single layer to the stud, and fixing the first module and the second module to the stud by piling each other with spacer.

7. The electronic apparatus according to claim 6, wherein the housing is formed with synthetic resin with the conductive layer provided from the inner surface of the outer shell to the outside of the edge of the opening;

the lid is formed with conductive members; and the conductive layer and the lid are electrically connected at the edge of the opening.

8. The electronic apparatus according to claim 6, wherein the first module is connected to the motherboard by a connector inserted in the piling direction with respect to the motherboard.

9. The electronic apparatus according to claim 6, wherein the second module is connected to the motherboard by a cable.

10. The electronic apparatus according to claim 6, wherein the first module has a label which is folded is a zigzag configuration and the label is pressed by the second module.

11. The electronic apparatus according to claim 6, wherein the second module is extractably inserted a tired module along the longitudinal direction of the housing as viewed from the user.

* * * * *